United States Patent [19]

Montalvo, III

[11] Patent Number: 4,457,408
[45] Date of Patent: Jul. 3, 1984

[54] SPRING ACTUATED DISC BRAKE ASSEMBLY WITH CAM STRUCTURE FOR FORCE MULTIPLICATION EFFECT

[76] Inventor: William W. Montalvo, III, 200 Riverside Industrial Pkwy., Portland, Me. 04103

[21] Appl. No.: 349,055

[22] Filed: Feb. 16, 1982

[51] Int. Cl.³ .............................................. F16D 55/18
[52] U.S. Cl. .................................. 188/72.2; 188/72.7; 188/170; 192/93 R
[58] Field of Search ..................... 188/24.15, 26, 71.7, 188/72.1, 72.2, 72.3, 72.4, 72.6, 72.7, 170, 196 V; 74/99 A, 103, 104, 110; 192/70.15, 70.23, 93 A, 93 C, 93 R

[56] References Cited

U.S. PATENT DOCUMENTS

| 3,392,807 | 7/1968 | Sommers | 188/72.2 |
| 3,997,033 | 12/1976 | Bulmer | 188/72.7 |
| 4,039,051 | 8/1977 | Otto | 188/72.1 |
| 4,064,973 | 12/1977 | Deem et al. | 188/71.7 |
| 4,089,393 | 5/1978 | Falk | 188/72.6 |
| 4,121,696 | 10/1978 | Margetts | 188/72.7 |
| 4,121,697 | 10/1978 | Kobelt et al. | 74/110 |

FOREIGN PATENT DOCUMENTS

| 1041027 | 10/1978 | Canada | 188/72.3 |
| 673667 | 11/1964 | Italy | 188/72.7 |

Primary Examiner—Douglas C. Butler
Assistant Examiner—R. R. Diefendorf
Attorney, Agent, or Firm—Brooks, Haidt, Haffner & Delahunty

[57] ABSTRACT

Because of the inverse relationship between spring actuating force generated by a compressed spring and the variable tangent angle of incidence between arcuate cam surfaces of opposed circular cam segments with cooperating cam followers, declining axial spring force, upon spring extension, is variably increased to a normal braking force of constant magnitude in a disc brake.

38 Claims, 13 Drawing Figures

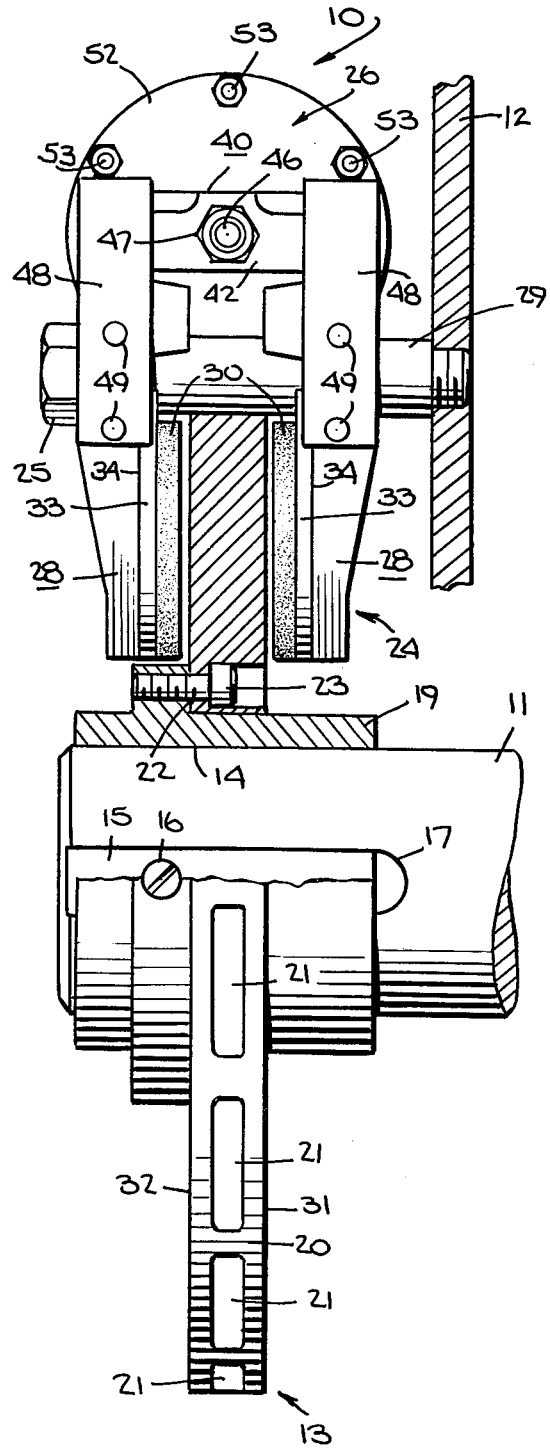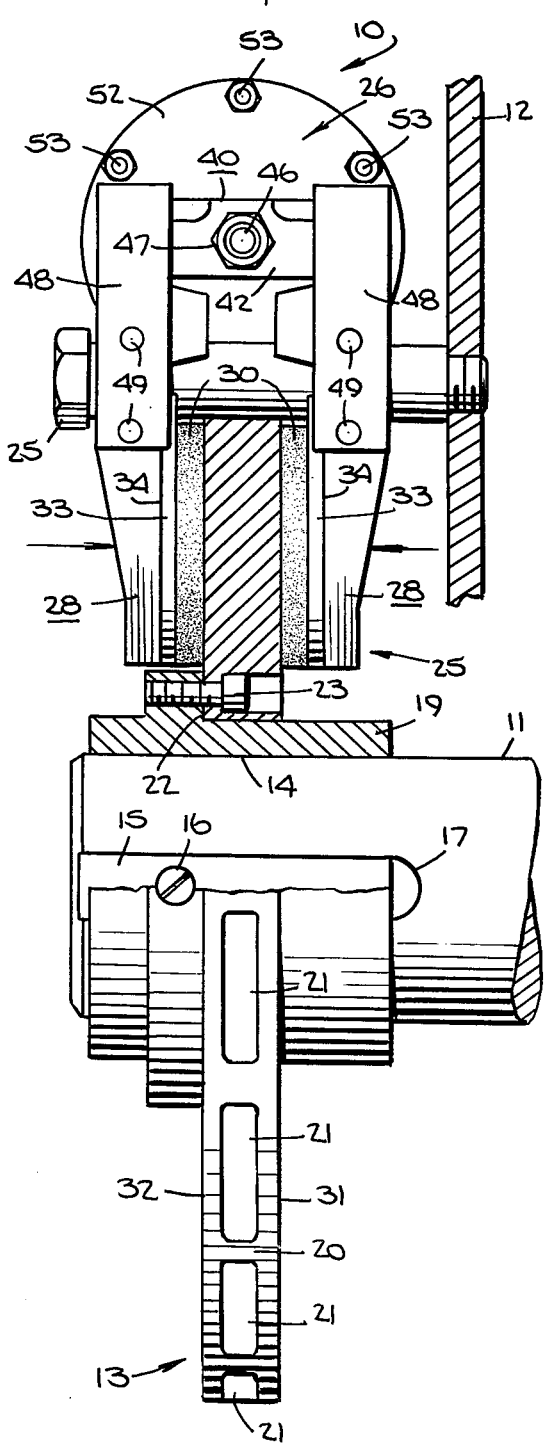

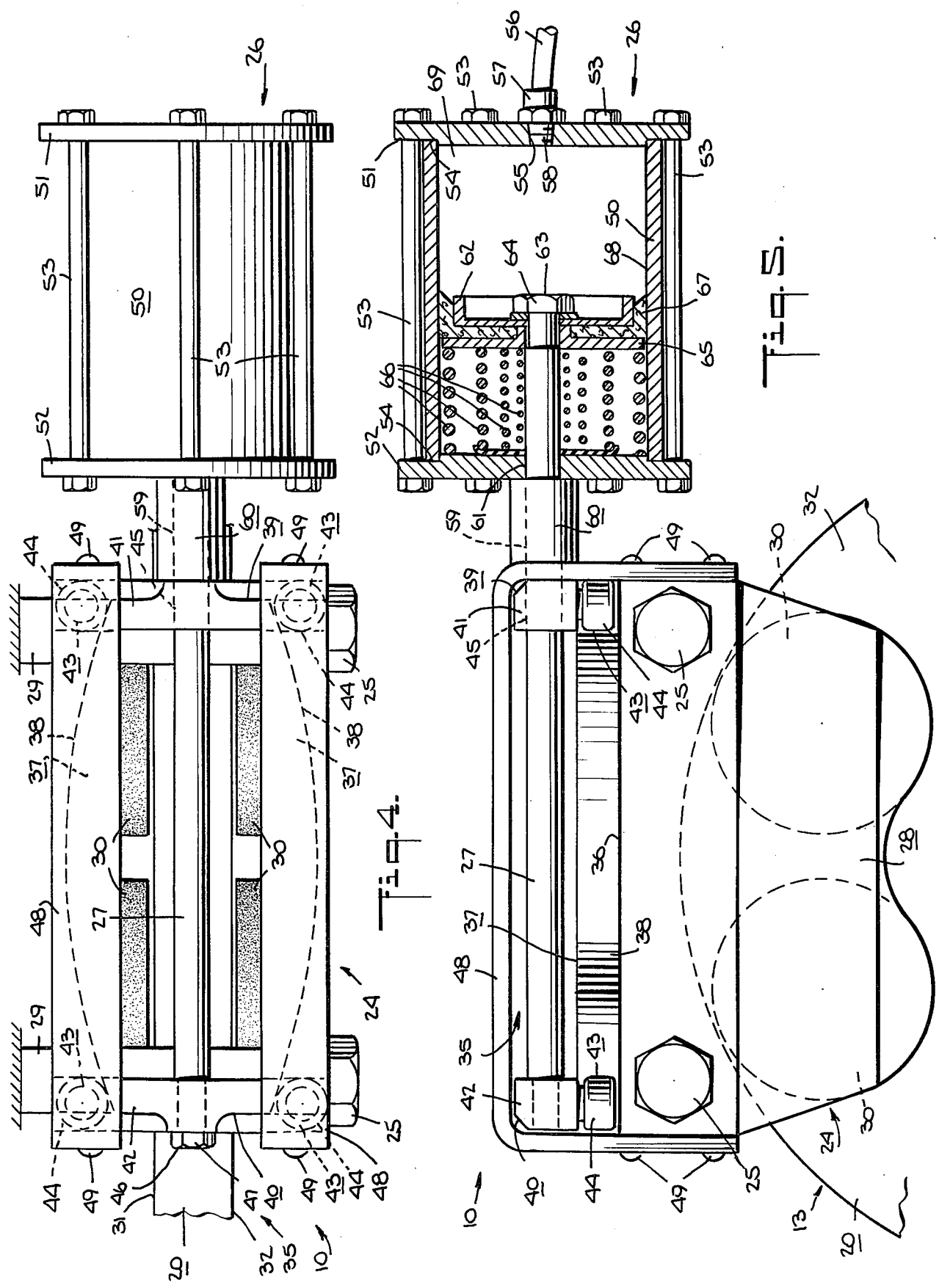

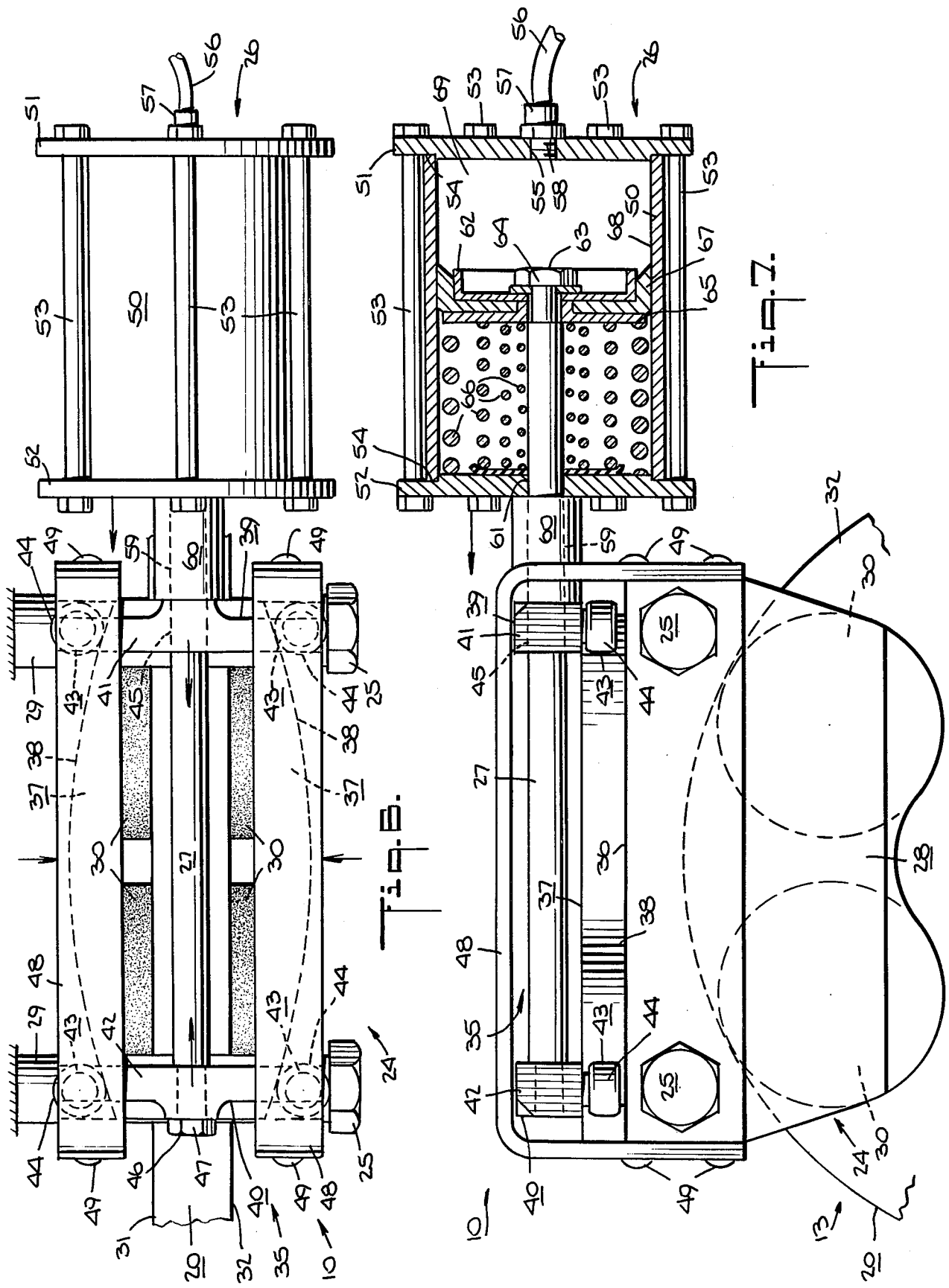

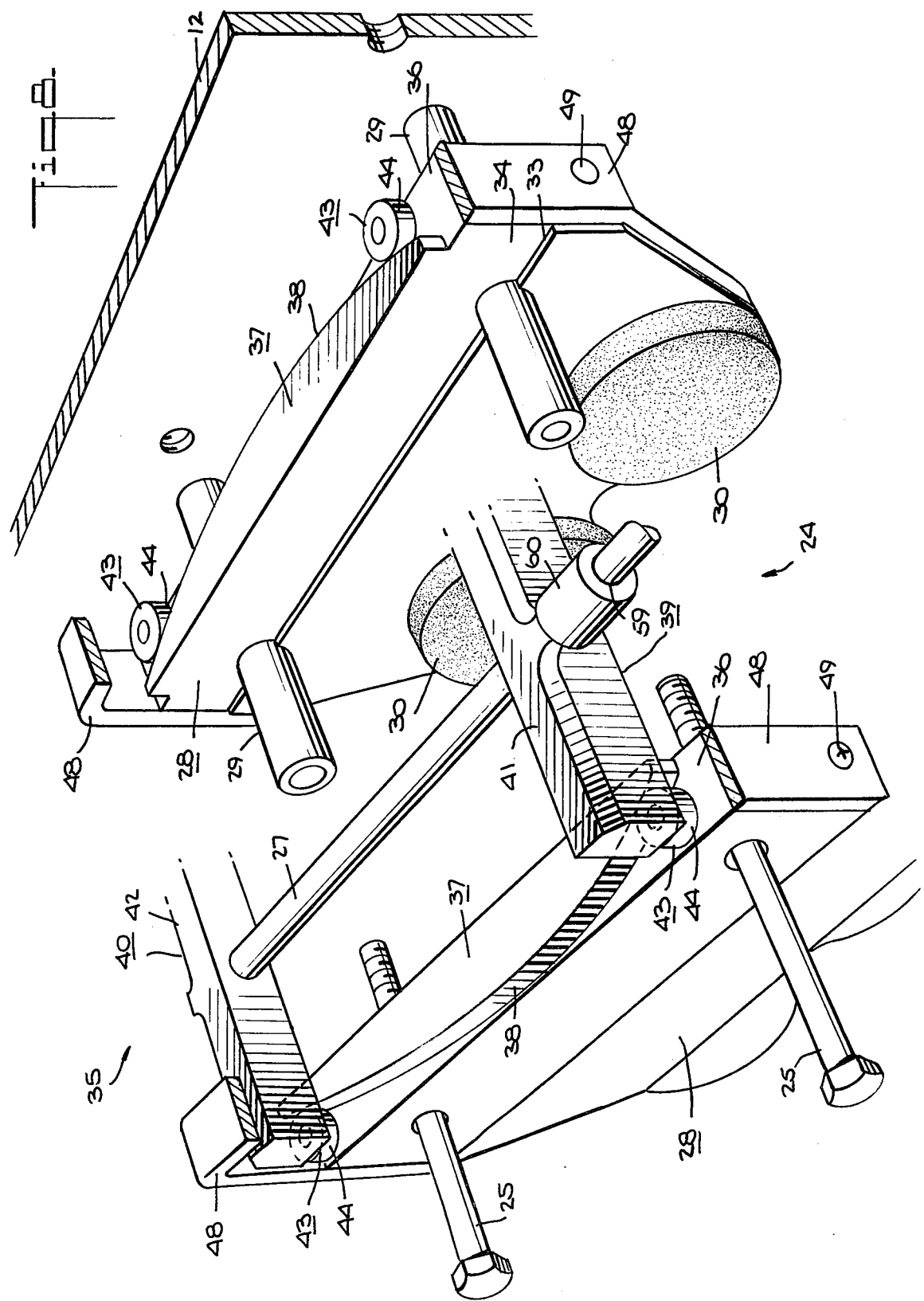

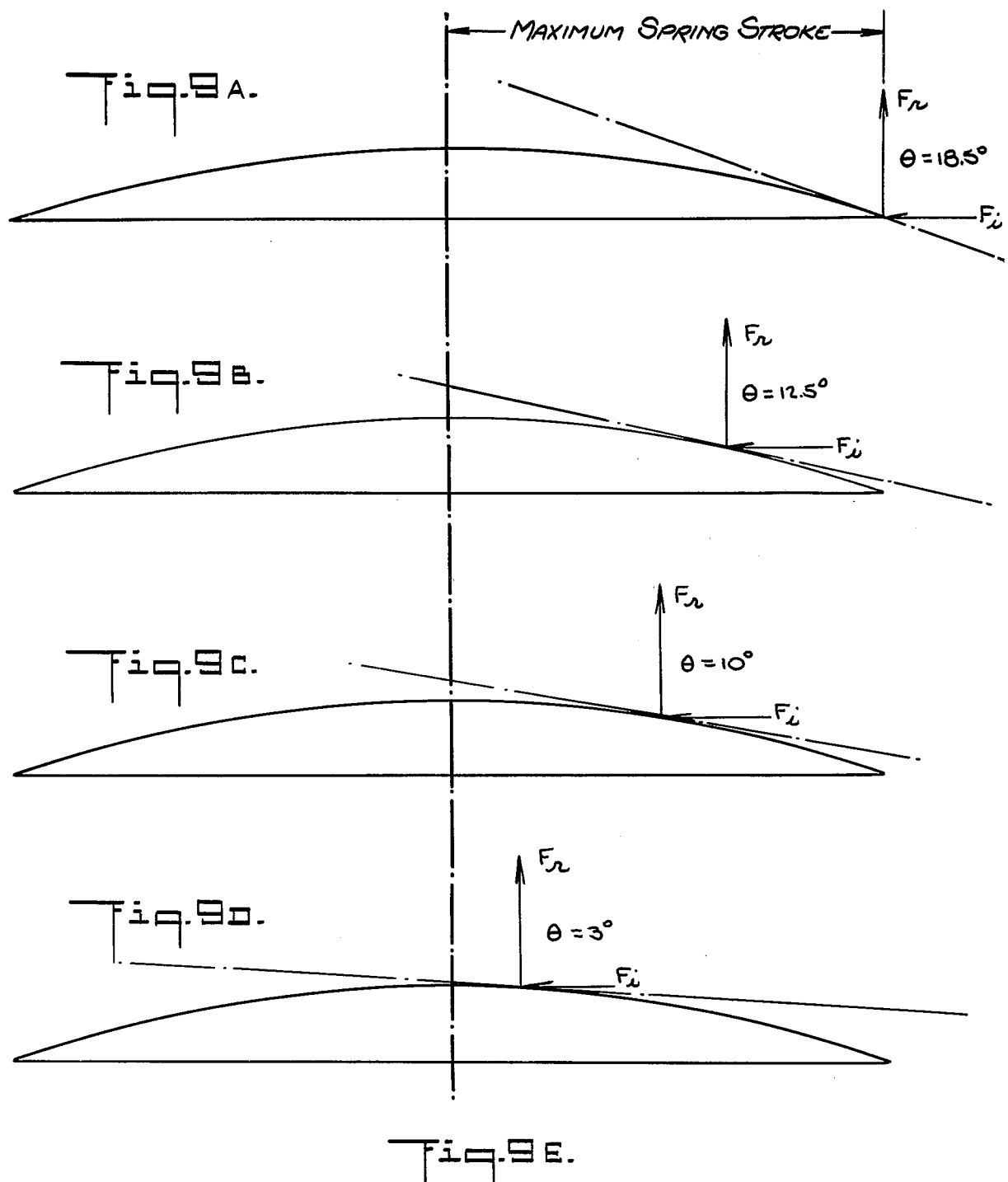

SPRING ACTUATED DISC BRAKE ASSEMBLY WITH CAM STRUCTURE FOR FORCE MULTIPLICATION EFFECT

BACKGROUND OF THE INVENTION

1. Field of the Invention

The present invention relates to friction coupling mechanisms such as brakes wherein a rotatable element is frictionally coupled to a relatively nonrotatable element, and clutches wherein two relatively rotatable elements are coupled and uncoupled. More particularly, the invention relates to an improved friction coupling mechanism for use in disc and caliper-type arrangements.

2. Description of the Prior Art

Brakes of a type having cam or wedge actuated friction members, that are urged against opposed radial surfaces of a rotor body for frictional engagement therewith, upon movement of the friction members parallel to an axis of rotation of the rotor, have been described in U.S. Pat. Nos. 3,997,033, 4,064,973, 4,089,393 and 4,121,697. U.S. Pat. No. 4,121,696 describes a somewhat similar device, but one which is mounted between a pair of rotatable discs.

SUMMARY OF THE INVENTION

This invention provides an improved friction coupling mechanism for disc-type brakes comprising a spring-actuated piston and cylinder module and a cam-actuated caliper assembly.

The caliper assembly variably multiplies the module's actuating force by means of circular cam segments and coordinated cam follower members in cooperating relationship therewith. As actuating spring force decreases linearly with spring extension, the tangent angle of incidence between the arcuate surfaces of the cam segments and the respective cooperating surfaces of the cam followers also changes linearly, but inversely to decaying spring pressure, to insure application of a constant normal braking force at the disc, regardless of the spring extension within spring limits.

The caliper assembly comprises two caliper members, each having a friction pad and a circular cam segment attached to an inner radial surface and an axial peripheral surface, respectively thereof. The caliper members are attached to a nonrotating body, such as a frame member, in spaced relation on opposed radial sides of a rotatable disc member, generally straddling a portion of the disc member at a peripheral edge thereof. The caliper members are mounted for to-and-fro motion in a direction parallel to the axis of rotation of the disc, so that upon actuation of the brake, the caliper members move together forcing the friction pads mounted thereon into frictional engagement with respective sides of the disc, to slow down or bring the rotating disc to rest. Upon release of the brake, the caliper members move away from the disc, thus freeing the friction pads from frictional engagement therewith.

Two cam followers draw together the caliper members upon actuation of the brake. Each cam follower comprises a rigid elongated member having a generally cylindrical roller member rotatably mounted thereon at both ends thereof.

The cam followers are movably mounted in spaced relation on both caliper members, above the cam segments thereon, where each follower is generally disposed parallel to the axis of rotation of the disc, so that the axial surface of one of the roller members from each of the cam followers is maintained in cooperative engagement with the arcuate surface of one of the cam segments. The other two roller members, namely, the remaining roller members from each of the cam followers, cooperates in like fashion with the arcuate surface of the other cam segment.

A rod member, which extends from the spring actuated module, connects the cam followers by medially passing through their elongated bodies in perpendicular relationship thereto. One end of the rod member is rigidly secured to the cam follower that is furthermost from the spring actuator. The other end of the rod is attached to a spring-biased piston within the spring actuator, which actuator has an axial end in cooperative engagement with the cam follower nearest it. This latter cam follower is slidably mounted on the rod member.

When the air/hydraulic pressure in the module is released to actuate the brake, a compressed spring in the module expands and forces against the piston causing the piston, the piston rod, and the cam follower attached thereto, to move in the direction of expansion, thus drawing the cam follower, which is attached to the rod, along the circular cam tracks. This drawing action causes an equal reactive force to be developed, which is transmitted through the module to the other cam follower simultaneously pushing it along the cam tracks in an opposite direction towards the first cam follower. As this occurs, the caliper members are moved nearer to each other, thus forcing the friction pads into frictional engagement with the disc. The system will then reach a neutral point, that is, a position where both cam followers are at rest in respect of each other along the circular cam tracks of the cam segments.

The braking force, which is exerted by the friction pads against the disc, is greater than the force exerted by the slightly expanded, but still compressed spring. Although the neutral point of the system will vary with friction pad wear, the braking force will remain constant (and magnified) due to the fact that the tangent angle of incidence (between the cam roller and the cam track surface) varies with declining spring force, provided, of course, that operation is maintained within the spring extension limit.

To disengage the brake, the air/hydraulic side of the spring module is re-pressurized causing the spring to be compressed and the cam rollers are then returned to their relaxed positions at opposite ends of the cam segments.

Although a presently preferred embodiment of the invention in the form of a single disc brake is described in detail, it will be understood that the principles and structure of the invention are contemplated to have wide applicability to other uses, for example, multiple module/caliper units equally arcuately spaced around a single disc, or a single caliper/module assembly having outwardly engaging caliper members for use in conjunction with two or more axially spaced discs.

These and other applications, objects and advantages of the invention will be more fully understood from the following detailed description of a preferred embodiment of the invention, especially when that description is read in conjunction with the accompanying drawing figures illustrating a brake according to the invention.

BRIEF DESCRIPTION OF THE DRAWINGS

In the accompanying drawings, in which like reference numerals indicate like parts throughout:

FIG. 2 is a side elevation view of a disc brake embodying a module and caliper assembly according to the invention and shows the caliper assembly in the disengaged condition;

FIG. 3 is a view, similar to view 2, but showing the caliper assembly in the engaged condition;

FIG. 4 is an enlarged top plan view of the disc brake of FIG. 1, with concealed parts indicated by dashed lines, and shows the caliper assembly in the disengaged condition;

FIG. 5 is a partial sectional front elevation view of the disc brake of FIG. 4;

FIG. 6 is a view, similar to view 4, but showing the caliper assembly in the engaged condition;

FIG. 7 is a partial sectional front elevation view of the disc brake of FIG. 6;

FIG. 8 is a fragmentary partially exploded view in perspective of a further enlarged caliper assembly of FIG. 1;

FIG. 9A, B, C and D diagrammatically illustrate the variable relationship between spring input force and resultant braking force; and FIG. 9E shows the mathematical relationship between variable angle of incidence and the force multiplication feature of the invention, and lists an example illustrating this relationship.

DETAILED DESCRIPTION OF A PREFERRED EMBODIMENT

Figure 1:
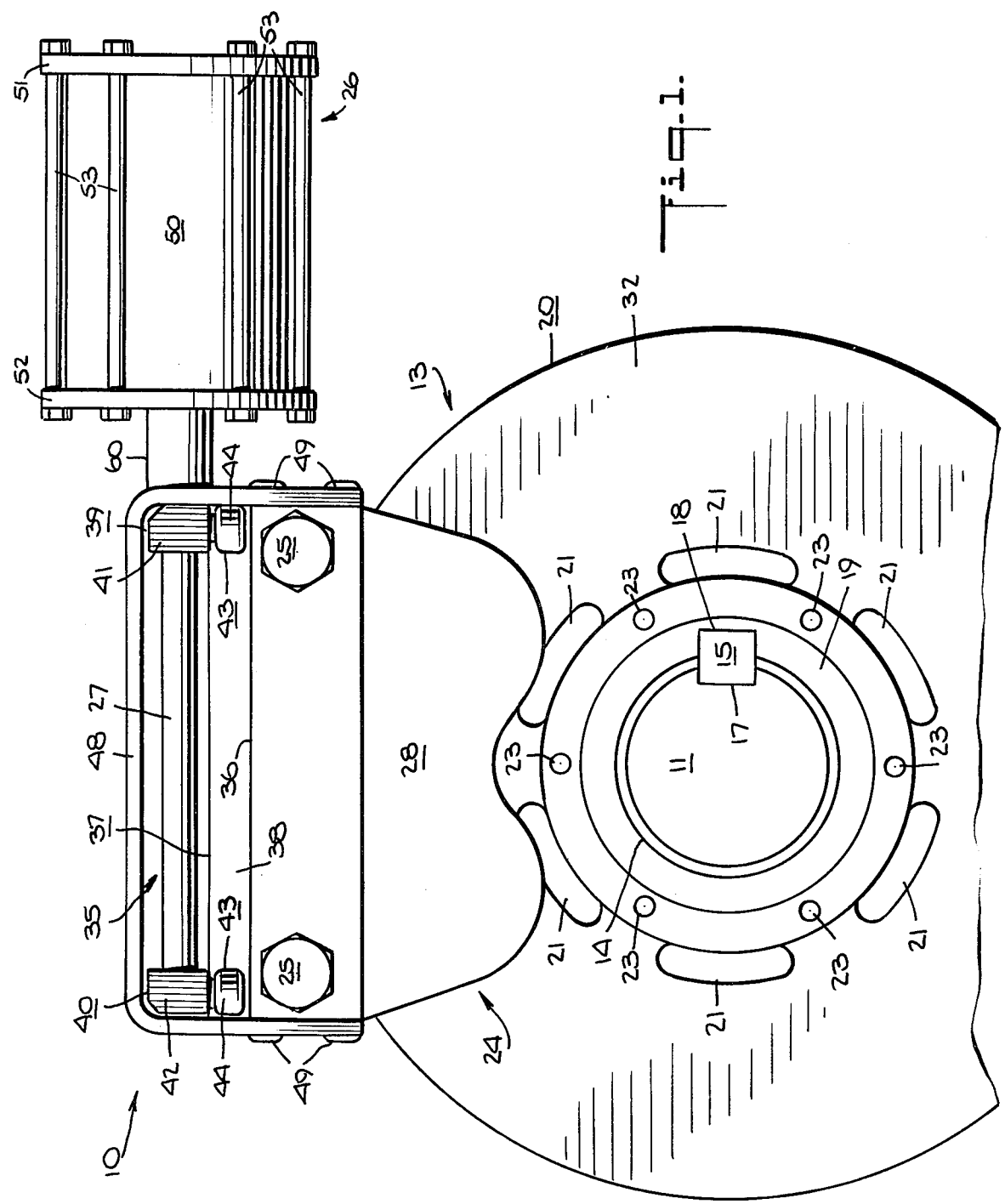
FIG. 1 is a front elevation view of a disc brake embodying a module and caliper assembly according to the invention.

The brake, generally designated by reference numeral 10 in the drawings, is of the type used for selectively frictionally engaging a freely rotatable member, shown as a shaft 11, with a relatively fixed nonrotatable member 12. The nonrotatable member 12 is shown in FIGS. 2, 3, and 8 and may comprise, for example, a frame section of the machine for which the brake 10 is used.

The reference numeral 13 generally designates a rotor body, having a central axial bore therethrough at 14, tightly fitted on the shaft 11 and secured for rotation therewith by a key member 15, which is secured to the rotor body 13 by a lock screw 16. The key member 15 is fitted within a keyseat 17 in the shaft 11 and projects into a keyway 18 of the bore 14. The rotor body 13 comprises a sleeve member 19, and a flat ring-shaped plate member 20 extending radially outward therefrom. There are a plurality of passageways 21 in the plate member 20 of the rotor body 13 which hasten the dissipation of heat energy arising from the braking action.

Attention is directed to the preferred manner of assembling the elements just described as best shown in Figs. 2 and 3. It will be seen that the sleeve member 19 has an annular step 22 for reception of the ring-like plate 20, which is secured to the sleeve member 19 by a plurality of equally arcuately spaced screws 23, one of which is shown, the heads of which preferably being recessed as indicated. The sleeve member 19 and the radially extending plate member 20 could also be of unitary construction.

The brake 10 comprises a caliper portion 24, which is slidably mounted on the nonrotatable member 12 using, for example, bolts 25, and a actuator portion 26, which is attached to the caliper 24 by a control rod 27. It will be seen that the caliper 24 straddles a portion of the plate member 20 of the rotor 13.

Referring now to FIG. 8, the caliper 24 is shown to comprise two generally wedged body members 28 mounted perpendicular to the axis of rotation of the shaft 11, each member 28 being disposed on opposed sides of the disc 20. The members 28 are slidably fitted over sleeve members 29, and the mounting bolts 25 are passed axially through the sleeves 29 to secure the caliper 24 to the nonrotatable member 12. A pair of spaced-apart friction shoes or pads 30 are carried by each member 28 on opposite sides of the disc 20 for frictional engagement with radial surfaces 31 and 32 of the disc 20.

The friction shoes 30, are mounted on a backing plate 33, which is then attached, for example, by bolting (not shown) or by clip (also not shown), to an inner radial surface 34 of the members 28. The free floating mounting of the caliper 24, in either axial direction parallel to the axis of rotation of the shaft 11, causes the friction shoes 30 to exert equal pressure on the surfaces 31 and 32 of the disc 20 so as to bring the rotor 13 to rest and to prevent it from rotation as shown in FIGS. 3, 6 and 7.

There is a cam means, generally indicated by the reference numeral 35, disposed on a perimetrical surface or side 36 of both members 28, which cam means includes circular cam segments 37, having an arcuate perimetrical surface on side 38, and first and second cam followers 39 and 40, respectively.

The arcuate surfaces 38 of the cam segments 37 are shown to be oppositely outwardly disposed in spaced relation to each other. However, although not shown in the drawings, it will be apparent that the arcuate surfaces 38 can be oppositely inwardly disposed, when, for instance, the members 28 are arranged back-to-back in spaced relation so that the members 28 move outward upon actuation of the brake 10, whenever a pair of axially spaced discs 20 are frictionally coupled together by a single caliper means. Whether one disc or a pair of discs are coupled and uncoupled, the device 10 of this invention can be used singularly or together with a plurality of such devices equally arcuately spaced around the axis of rotation of the shaft 11. It will also be understood that if the fixed non-rotatable member 12 was replaced with a rotatable member, which has its axis aligned with the axis of the shaft 11, the device 10 would function as a clutch.

As shown in the drawing, the cam segment 37 and the member 28 are of unitary construction. However, they may be constructed of elements secured together either by bolting, by welding, or by a combination thereof.

The cam followers 39 and 40 each comprise an elongated member 41 and 42, respectively, having a generally cylindrical roller member 43 rotatably mounted thereon at both ends thereof, so that axial surface 44 of the cam rollers 43 cooperatively engages the arcuate surface 38 of the respective cam segments 37 when the cam followers 39 and 40 move inwardly toward or outwardly away from each other upon engagement and disengagement of the brake 10.

The rod member 27 axially extends from the module 26 and structurally connects the cam follower 40 with the cam follower 39. Referring to FIGS. 4 and 6, it will be seen that the rod 27 is slidably fitted through the member 41 of the cam follower 39 at bore 45, which bore 45 transversely extends through the member 41 medially between the rollers 43. It will also be seen that the cam follower 40 is mounted on the rod 27 at an end 46 thereof and is secured thereto by a nut 47.

A member 48, having a profile shaped somewhat like an inverted letter "U", is attached to each caliper member 28 by fasteners 49. The member 48 secures the brake actuating mechanism, including the cam followers 39 and 40, and the module 26, to the caliper 24, and also keeps the cam rollers 43 in proper cooperative relation with the respective cam segments 37.

The module portion 26 of the brake 10 comprises a cylindrical housing 50, that is closed at one end by a cover 51 and at an opposite end by a cover 52. The covers 51 and 52, which extend radially outward of the cylinder or housing 50, are jointly secured to the housing 50 by a plurality of equally arcuately spaced bolts 53, and it will be seen in FIGS. 5 and 7 that both covers 51 and 52 have an annular step 54 for reception of the housing 50.

The cover 51 has a central bore at 55 for providing air to the interior of the housing 50. A flexible air hose 56 feeds air under pressure from a plant air supply, which may typically provide sixty pounds per square inch gauge pressure, to the housing 50, and the hose 56 is preferably secured by a threaded fitting 57 at an outer end 58 of the bore 55.

Referring now to FIGS. 5 and 7, it will be seen that the rod 27 is slidably fitted through a passageway 59 of a sleeve member 60, which passageway 59 is coaxially aligned with a central bore 61 of the cover 52. The sleeve member 60 is positioned between the member 41 of the cam follower 39 and the cover 52 of the module 26. The sleeve member 60 transmits inward axial motion of the module 26 to the cam follower 39.

Referring again to FIGS. 5 and 7, a generally cup-shaped piston 62 is shown mounted on the rod 27 at an end 63 thereof inside the housing 50 of the module 26. The piston 62 is secured to the rod 27 by a nut 64.

Adjacent to the piston 62, there is a plate member 65 and, axially biased between the plate member 65 and the cover 53 of the housing 50, there are a plurality of cylindrical helical springs 66 concentrically disposed around the rod 27 for axially urging the plate 65 and the piston 62 away from the cover 52. Although not shown in the drawings, it will be understood that a single spring 66 can be utilized, if the spring 66 is sufficiently resilient for the particular application.

A flexible gasket member 67 is fitted within the annular space defined by the plate 65, the piston 62, and an inner wall 68 of the housing 50 to insure that chamber 69 is relatively fluid-tight.

When the air (or hydraulic) pressure in the chamber 69 is released, the compressed springs 66 expand, thus causing the rod 27 to move in the direction of expansion. The rod 27 then draws the cam follower 40 axially inwardly towards the module 26. As this occurs, the cam rollers 43 on the member 42 roll against the respective surfaces 38 of the cam segments 37.

The spring expansion also causes an equal reactive force to be developed within the housing 50, which force is then transmitted through the sleeve member 60 to the member 41 of the cam follower 39 pushing this follower 39 towards the cam follower 40. As this occurs, the cam rollers 43 on the member 41 roll against the respective surfaces 38 of the cam segments 37, and the module 26 moves toward the caliper 24 by an amount generally equal to ½ of the length of expansion of the springs 66, as best shown by comparison of FIGS. 4 and 5 with FIGS. 6 and 7. Movement of the cam followers 39 and 40 axially inwardly towards one another along the arcuate surfaces 38 of the cam segments 37 forces the members 28 inwardly towards the rotor 13 causing the friction shoes 30 to engage the surfaces 31 and 32 of the disc 20 and bring the rotor 13 to rest.

To disengage the brake 10, the air (or hydraulic) side 69 of the housing 51 is re-pressurized causing the springs 66 to be compressed. The members 28 move outwardly away from the rotor 13 and the cam followers 39 and 40 return to their respective relaxed positions on opposite ends of the cam segments 37. Although not shown in the drawings, a reversed variation with air or hydraulic actuation and spring release will be apparent.

The brake 10 will automatically compensate for wear of the friction shoes 30. It is noted that the cam followers 39 and 40 will continue to move axially inwardly towards one another, when the chamber 69 is depressurized, until the friction shoes properly engage the friction surfaces 31 and 32 of the disc 20. Thus, normal wear and tear of the friction shoes 30 will be compensated for by further axial inward movement of the cam followers 39 and 40, and this movement will continue until the brake 10 is fully engaged.

Attention is directed to FIGS. 9A through E, inclusive, where the connection between variable angle of incidence and the force mutliplication feature of the invention will be more fully understood. The mathematical relationship is best described as $F_r = F_i \times \mathrm{Cotangent}\ \theta$, where $F_r$ is the resultant braking force, $F_i$ is the input spring force, and $\theta$ is the angle of incidence at the location of incidence between any roller member 43 and the respective cam segment 37. As both $F_i$ and $\theta$ approach zero, the contangent $\theta$ approaches infinity and the resultant force, $F_r$, is shown to remain constant having a value greater than that of the input force, $F_i$.

While a preferred embodiment of the invention has been shown and described, various modifications, changes in size and shape of parts, etc., will suggest themselves to those familiar with the art, and such changes are considered to be within the spirit and scope of the invention.

What is claimed is:

1. A disc brake mechanism for selectively frictionally coupling at least one rotatable disc member with a relatively non-rotatable body member comprising:
   a caliper means slidably mounted on said non-rotatably body member for to-and-fro movement in a direction generally parallel to the axis of rotation of said at least one rotatable disc member, said caliper means comprising a pair of like caliper members in spaced generally parallel relationship, each of said caliper members having an inner friction surface for frictional engagement with a respective opposed surface of said at least one rotatable disc member;
   means for actuating said disc brake mechanism; and
   cam means for transferring axial movement of said actuating means to a movement of said caliper members in a direction generally parallel to the axis of rotation of said at least one rotatable disc member and for intensifying the actuating force generated by said actuating means wherein said cam means comprises a circular cam seqment mounted on a perimetrical side of each of said caliper members, said circular cam segment having a perimetrical side which is at least partially arcuate and which is transversely disposed in respect of said perimetrical side of said caliper member.

2. The mechanism of claim 1 wherein said arcuate sides of said circular cam segments are convex and outwardly disposed in spaced relation to each other, and wherein said inner friction surface of each of said caliper members frictionally engages a respective radial surface of a single rotatable disc when said caliper members move inwardly together in a direction generally parallel to the axis of rotation of said single rotatable disc member.

3. The mechanism of claim 1 wherein said arcuate sides of said circular cam segments are convex and inwardly disposed in spaced relation to each other, and wherein said inner friction surface of each of said caliper members respectively frictionally engages a mutually opposed radial surface of one of two coaxial spaced rotatable disc members when said caliper members move outwardly away from one another in a direction generally parallel to the axis of rotation of said two rotatable disc members.

4. The mechanism of claim 1 wherein said cam means comprises:
a pair of cam followers, each comprising an elongated body member and having a generally cylindrical roller member rotatably mounted on opposed ends of said elongated body member for rotation about an axis transversely disposed to the axis of rotation of said at least one rotatable disc member, each of said cam followers being spaced in opposed relation and generally disposed parallel to the axis of rotation of said at least one rotatable disc member for to-and-fro movement in a direction which is transverse to the axis of rotation of said at least one rotatable disc member.

5. The mechanism of claim 1 wherein said cam means comprises:
a movable rod member slidably mounted on a first cam follower and axially extending to a second cam follower, said second cam follower being in spaced relation to said first cam follower and rigidly fixed to an axial end of said rod member, an opposite axial end of said rod member cooperatively engaging said actuating means.

6. The mechanism of claim 1 wherein said means for actuating said disc brake mechanism is mounted on said caliper means.

7. The mechanism of claim 1 wherein said means for actuating said disc brake mechanism comprises a piston and cylinder.

8. The mechanism of claim 7 further comprising means for biasing said piston within said cylinder for movement in a direction generally perpendicular to the axis of rotation of said at least one rotatable disc member.

9. The mechanism of claim 8 wherein said biasing means comprises spring actuation and fluid release means.

10. The mechanism of claim 9 wherein said fluid is air.

11. The mechanism of claim 8 wherein said biasing means comprises fluid actuation and spring release means.

12. The mechanism of claim 11 wherein said fluid is air.

13. A disc brake mechanism for selectively frictionally coupling a rotatable disc member with a relatively non-rotatable body member comprising:

a caliper means slidably mounted on said non-rotatable body member for to-and-fro movement on opposed sides of said rotatable disc member in a direction generally parallel to the axis of rotation of said rotatable disc member, said caliper means comprising a pair of like caliper members in spaced generally parallel relationship, each of said caliper members having an inner friction surface for frictional engagement with a respective opposed surface of said rotatable disc member when said caliper members move axially inwardly together;

a piston and cylinder actuator mounted on said caliper means for actuating said disc brake mechanism;

means for biasing a piston within said piston and cylinder actuator for movement in a direction generally perpendicular to the axis of rotation of said rotatable disc member;

cam means for transferring axial movement of said piston and cylinder actuator to a movement of said caliper members in a direction generally parallel to the axis of rotation of said rotatable disc member and for intensifying the actuating force generated by said piston and cylinder actuator, comprising: a circular cam segment mounted on a perimetrical side of each of said caliper members, said circular cam segment having a perimetrical side which is at least partially arcuate and which is transversely disposed in respect of said perimetrical side of said caliper member wherein said at least partially arcuate sides of said circular cam segments are convex and outwardly disposed in spaced relation; a pair of cam followers, each comprising an elongated body member and having a generally cylindrical roller member rotatably mounted on opposed ends of said elongated body member for rotation about an axis transversely disposed to the axis of rotation of said rotatable disc member, an axial surface of a first one of said roller members of each of said cam followers cooperatively engaging said at least partially arcuate side of one of said cam segments, and an axial surface of the other of said roller members of each of said cam followers cooperatively engaging said at least partially arcuate side of the second of said cam segments, each of said cam followers being spaced in opposed relation and generally disposed parallel to the axis of rotation of said rotatable disc member; a movable rod member extending from said piston and cylinder actuator, said rod member passing axially through a passageway in said first one of said cam followers, said passageway transversely extending through said elongated body of said first cam follower, an axial end of said rod member oppositely disposed of said piston and cylinder actuator being generally perpendicularly attached to said elongated body of said second cam follower, an opposite axial end of said rod member being attached to a piston within a cylinder of said piston and cylinder actuator, said cylinder cooperatively engaging said elongated body of said first cam follower for reciprocating motion therewith in opposed relationship with the reciprocating motion of said piston and said rod member and said second cam follower attached to said rod member; and means for biasing said piston within said cylinder for movement in a direction generally perpendicular to the axis of rotation of said rotatable disc member.

14. The mechanism of claim 13 wherein said biasing means comprises spring actuation and fluid release means.

15. The mechanism of claim 14 wherein said fluid is air.

16. The mechanism of claim 13 wherein said biasing means comprises fluid actuation and spring release means.

17. The mechanism of claim 16 wherein said fluid is air.

18. A disc brake mechanism for selectively frictionally coupling a pair of spaced rotatable disc members with a relatively non-rotatable body member comprising:
- a caliper means slidably mounted on said non-rotatable body member for to-and-fro movement between said rotatable disc members in a direction generally parallel to the axis of rotation of said rotatable disc members, said caliper means comprising a pair of like caliper members in spaced generally parallel relationship, each of said caliper members having an inner friction surface for frictional engagement with a mutually opposed surface of a respective one of said pair of rotatable disc members when said caliper members move axially outwardly away from one another;
- a piston and cylinder actuator mounted on said caliper means for actuating said disc brake mechanism;
- means for biasing a piston within said piston and cylinder actuator for movement in a direction generally perpendicular to the axis of rotation of said rotatable disc members;
- cam means for transferring axial movement of said piston and cylinder actuator to a movement of said caliper members in a direction generally parallel to the axis of rotation of said rotatable disc members and for intensifying the actuating force generated by said piston and cylinder actuator, comprising: a circular cam segment mounted on a perimetrical side of each of said caliper members, said circular cam segment having a perimetrical side which is at least partially arcuate and which is transversely disposed in respect of said perimetrical side of said caliper member wherein said at least partially arcuate sides of said circular cam segments are convex and inwardly disposed in spaced relation; a pair of cam followers, each comprising an elongated body member and having a generally cylindrical roller member rotatably mounted on opposed ends of said elongated body member for rotation about an axis transversely disposed to the axis of rotation of said rotatable disc members, an axial surface of a first one of said roller members of each of said cam followers cooperatively engaging said at least partially arcuate side of one of said cam segments, and an axial surface of the other of said roller members of each of said cam followers cooperatively engaging said at least partially arcuate side of the second of said cam segments, each of said cam followers being spaced in opposed relation and generally disposed parallel to the axis of rotation of said rotatable disc members; a movable rod member extending from said piston and cylinder actuator, said rod member passing axially through a passageway in said first one of said cam followers, said passageway transversely extending through said elongated body of said first cam follower, an axial end of said rod member oppositely disposed of said piston and cylinder actuator being generally perpendicularly attached to said elongated body of said second cam follower, an opposite axial end of said rod member being attached to a piston within a cylinder of said piston and cylinder actuator, said cylinder cooperatively engaging said elongated body of said first cam follower for reciprocating motion therewith in opposed relationship with the reciprocating motion of said piston and said rod member and said second cam follower attached to said rod member; and
- means for biasing said piston within said cylinder for movement in a direction generally perpendicular to the axis of rotation of said rotatable disc members.

19. The mechanism of claim 18 wherein said biasing means comprises spring actuation and fluid release means.

20. The mechanism of claim 19 wherein said fluid is air.

21. The mechanism of claim 18 wherein said biasing means comprises fluid actuation and spring release means.

22. The mechanism of claim 22 wherein said fluid is air.

23. A mechanism for selectively frictionally coupling two relatively rotatable coaxial disc members comprising:
- a caliper means slidably mounted on the first one of said rotatable disc members for to-and-fro movement in a direction generally parallel to the axis of rotation of said rotatable disc members, said caliper means comprising a pair of like caliper members having an inner friction surface for frictional engagement with a respective opposed surface of the second of said rotatable disc members;
- means for actuating said mechanism; and
- cam means for transferring axial movement of said actuating means to a movement of said caliper members in a direction generally parallel to the axis of rotation of said rotatable disc members and for intensifying the actuating force generated by said actuating means, said cam means comprising a circular cam segment mounted on a perimetrical side of each of said caliper members, said circular cam segment having a perimetrical side which is at least partially arcuate and which is transversely disposed in respect of said perimetrical side of said caliper member.

24. The mechanism of claim 23 wherein said arcuate sides of said circular cam segments are convex and outwardly disposed in spaced relation to each other, and wherein said inner friction surface of each of said caliper members frictionally engages a respective radial surface of said second rotatable disc member when said caliper members move axially inwardly together in a direction generally parallel to the axis of rotation of said rotatable disc members.

25. The mechanism of claim 23 wherein said cam means comprises:
- a pair of cam followers, each comprising an elongated body member and having a generally cylindrical roller member rotatably mounted on opposed ends of said elongated body member for rotation about an axis transversely disposed to the axis of rotation of said rotatable disc members, each of said cam followers being spaced in opposed relation and generally disposed parallel to the axis of rotation of said rotatable disc members for to-and-fro movement in a direction which is transverse to the axis of rotation of said rotatable disc members.

26. The mechanism of claim 23 wherein said cam means comprises:
a movable rod member slidably mounted on a first cam follower and axially extending to a second cam follower, said second cam follower being in spaced relation to said first cam follower and rigidly fixed to an axial end of said rod member, an opposite axial end of said rod member cooperatively engaging said actuating means.

27. The mechanism of claim 23 wherein said means for actuating said mechanism is mounted on said caliper means.

28. The mechanism of claim 23 wherein said means for actuating said mechanism comprises a piston and cylinder.

29. The mechanism of claim 28 further comprising means for biasing said piston within said cylinder for movement in a direction generally perpendicular to the axis of rotation of said rotatable disc members.

30. The mechanism of claim 29 wherein said biasing means comprises spring actuation and fluid release means.

31. The mechanism of claim 30 wherein said fluid is air.

32. The mechanism of claim 29 wherein said biasing means comprises fluid actuation and spring release means.

33. The mechanism of claim 32 wherein said fluid is air.

34. A mechanism for selectively frictionally coupling two relatively rotatable coaxial disc members comprising:
a caliper means slidably mounted on a first one of said rotatable disc members for to-and-fro movement on opposed sides of the second of said rotatable disc members in a direction generally parallel to the axis of rotation of said rotatable disc members, said caliper means comprising a pair of like caliper members in spaced generally parallel relationship, each of said caliper members having an inner friction surface for frictional engagement with a respective opposed surface of said second rotatable disc member when said caliper members move axially inwardly together;
a piston and cylinder actuator mounted on said caliper means for actuating said mechanism;
means for biasing a piston within said piston and cylinder actuator for movement in a direction generally perpendicular to the axis of rotation of said rotatable disc members;
cam means for transferring axial movement of said piston and cylinder actuator to a movement of said caliper members in a direction generally parallel to the axis of rotation of said rotatable disc members and for intensifying the actuating force generated by said piston and cylinder actuator, comprising: a circular cam segment mounted on a perimetrical side of each of said caliper members, said circular cam segment having a perimetrical side which is at least partially arcuate and which is transversely disposed in respect of said perimetrical side of said caliper member wherein said at least partially arcuate sides of said circular cam segments are convex and outwardly disposed in spaced relation; a pair of cam followers, each comprising an elongated body member and having a generally cylindrical roller member rotatably mounted on opposed ends of said elongated body member for rotation about an axis transversely disposed to the axis of rotation of said rotatable disc members, an axial surface of a first one of said roller members of each of said cam followers cooperatively engaging said at least partially arcuate side of one of said cam segments, and an axial surface of the other of said roller members of each of said cam followers cooperatively engaging said at least partially arcuate side of the second of said cam segments, each of said cam followers being spaced in opposed relation and generally disposed parallel to the axis of rotation of said rotatable disc members; a movable rod member extending from said piston and cylinder actuator, said rod member passing axially through a passageway in said first one of said cam followers, said passageway transversely extending through said elongated body of said first cam follower, an axial end of said rod member oppositely disposed of said piston and cylinder actuator being generally perpendicularly attached to said elongated body of said second cam follower, an opposite axial end of said rod member being attached to a piston within a cylinder of said piston and cylinder actuator, said cylinder cooperatively engaging said elongated body of said first cam follower for reciprocating motion therewith in opposed relationship with the reciprocating motion of said piston and said rod member and said second cam follower attached to said rod member; and
means for biasing said piston within said cylinder for movement in a direction generally perpendicular to the axis of rotation of said rotatable disc members.

35. The mechanism of claim 34 wherein said biasing means comprises spring actuation and fluid release means.

36. The mechanism of claim 35 wherein said fluid is air.

37. The mechanism of claim 34 wherein said biasing means comprises fluid actuation and spring release means.

38. The mechanism of claim 37 wherein said fluid is air.

* * * * *